(12) United States Patent
Sobanski et al.

(10) Patent No.: US 11,668,200 B2
(45) Date of Patent: *Jun. 6, 2023

(54) VANE WITH PIN MOUNT AND ANTI-ROTATION

(71) Applicant: RAYTHEON TECHNOLOGIES CORPORATION, Farmington, CT (US)

(72) Inventors: Jon E. Sobanski, Glastonbury, CT (US); Howard J. Liles, Newington, CT (US); Bryan P. Dube, Columbia, CT (US); Wojciech Lipka, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,914

(22) Filed: Jan. 15, 2021

(65) Prior Publication Data

US 2022/0228500 A1 Jul. 21, 2022

(51) Int. Cl.
  *F01D 9/04* (2006.01)
  *F01D 5/18* (2006.01)
  *F01D 5/28* (2006.01)

(52) U.S. Cl.
  CPC .............. *F01D 9/042* (2013.01); *F01D 5/18* (2013.01); *F01D 9/041* (2013.01); *F01D 5/284* (2013.01); *F05D 2300/6033* (2013.01)

(58) Field of Classification Search
  CPC .......... F01D 9/041; F01D 5/284; F01D 9/042; F01D 5/282; F01D 5/189; F01D 5/147;
  (Continued)

(56) References Cited

U.S. PATENT DOCUMENTS 5,634,767 A 6/1997 Dawson
7,114,917 B2 10/2006 Legg
(Continued)

FOREIGN PATENT DOCUMENTS

EP 3121379 1/2017

OTHER PUBLICATIONS

European Search Report for European Patent Application No. 22151878.0 dated Jun. 24, 2022.

*Primary Examiner* — Eric J Zamora Alvarez
(74) *Attorney, Agent, or Firm* — Carlson, Gaskey & Olds, P.C.

(57) ABSTRACT

A vane arc segment includes an airfoil fairing that has first and second fairing platforms and a hollow airfoil section that extends there between. A spar has a spar platform adjacent the first fairing platform and a spar leg that extends from the spar platform and through the hollow airfoil section. The spar leg has an end portion that is distal from the platform and that protrudes from the second fairing platform. The end portion has a clevis mount. There is a support platform adjacent the second fairing platform. The support platform has a through-hole through which the end portion of the spar leg extends such that the clevis mount protrudes from the support platform. A pin extends though the clevis mount and locks the support platform to the spar leg such that the airfoil fairing is trapped between the spar platform and the support platform.

21 Claims, 7 Drawing Sheets

(58) Field of Classification Search
CPC . F01D 5/18; F01D 25/243; F01D 9/02; F01D 25/246; F01D 25/24; F01D 5/20; F01D 5/225; F01D 5/3015; F01D 5/3084; F01D 25/12; F05D 2300/6033; F05D 2240/12; F05D 2260/30; F05D 2220/32; F05D 2260/31; F05D 2300/21; F05D 2260/941; F05D 2300/603; F05D 2230/64; F05D 2260/36; B23P 15/04; F04D 29/324

See application file for complete search history.

(56) References Cited

U.S. PATENT DOCUMENTS

| | | | |
|---|---|---|---|
| 8,251,652 B2* | 8/2012 | Campbell | F01D 5/284 |
| | | | 415/209.3 |
| 8,292,580 B2* | 10/2012 | Schiavo | F01D 9/041 |
| | | | 416/96 A |
| 10,309,240 B2 | 6/2019 | Heitman et al. | |
| 11,299,995 B1* | 4/2022 | Sobanski | F01D 9/065 |
| 11,371,371 B1* | 6/2022 | Sobanski | F01D 5/147 |
| 2016/0177761 A1 | 6/2016 | Huizenga et al. | |
| 2017/0022833 A1* | 1/2017 | Heitman | F01D 9/041 |
| 2019/0368360 A1* | 12/2019 | Freeman | F01D 9/042 |
| 2019/0390558 A1* | 12/2019 | Sippel | F01D 9/065 |
| 2020/0072066 A1 | 3/2020 | Thomas et al. | |
| 2020/0131092 A1 | 4/2020 | De Diego et al. | |
| 2020/0200023 A1 | 6/2020 | Whittle et al. | |
| 2020/0362709 A1* | 11/2020 | Whittle | F01D 5/284 |
| 2020/0408100 A1* | 12/2020 | Whittle | F01D 9/041 |

* cited by examiner

US 11,668,200 B2

VANE WITH PIN MOUNT AND ANTI-ROTATION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing that has first and second fairing platforms and a hollow airfoil section extending there between. A spar has a spar platform adjacent the first fairing platform and a spar leg that extends from the spar platform and through the hollow airfoil section. The spar leg has an end portion that is distal from the platform and that protrudes from the second fairing platform. The end portion has a clevis mount. A support platform adjacent the second fairing platform has a through-hole through which the end portion of the spar leg extends such that the clevis mount protrudes from the support platform, and a pin extends though the clevis mount and locks the support platform to the spar leg such that the airfoil fairing is trapped between the spar platform and the support platform.

In a further embodiment of any of the foregoing embodiments, the clevis mount includes first and second prongs that have respective pin holes that are coaxially aligned with each other, and the pin is disposed in the pin hole.

In a further embodiment of any of the foregoing embodiments, the airfoil fairing is ceramic.

In a further embodiment of any of the foregoing embodiments, the spar leg includes forward and aft sides, and the pin is offset toward either the forward side or the aft side.

In a further embodiment of any of the foregoing embodiments, a side of the through-hole defines a ledge and the spar leg has a stop that is complementary to the ledge so as to seat there with.

In a further embodiment of any of the foregoing embodiments, the stop is radially and axially offset from the pin.

In a further embodiment of any of the foregoing embodiments, the stop includes a protruding lip.

In a further embodiment of any of the foregoing embodiments, the protruding lip defines a bearing surface that contacts the ledge. The bearing surface and the ledge having an arced geometry.

In a further embodiment of any of the foregoing embodiments, upon rotation of the support platform about the pin, the stop limits rotational movement of the support platform.

A vane arc segment according to an example of the present disclosure includes an airfoil fairing that has first and second fairing platforms and a hollow airfoil section that extends there between. The airfoil is subject to an aerodynamic load. A spar has a spar platform adjacent the first fairing platform and a spar leg that extends from the spar platform and through the hollow airfoil section. The spar leg has an end portion that is distal from the platform and that protrudes from the second fairing platform. The end portion has a clevis mount. A support platform is adjacent the second fairing platform. The airfoil fairing transferrs at least a portion of the aerodynamic load to the support platform. The support platform has a through-hole through which the end portion of the spar leg extends such that the clevis mount protrudes from the support platform. A pin extends though the clevis mount and locking the support platform to the spar leg such that the airfoil fairing is trapped between the spar platform and the support platform. A side of the through-hole defines a ledge and the spar leg includes a stop that is complementary to the ledge. The support platform has a tendency to rotate about the pin under the aerodynamic load received from the airfoil fairing. The stop bears against the ledge and limits rotation of the support platform.

In a further embodiment of any of the foregoing embodiments, the clevis mount includes first and second prongs that have respective pin holes that are coaxially aligned with each other, and the pin is disposed in the pin hole.

In a further embodiment of any of the foregoing embodiments, the airfoil fairing is ceramic.

In a further embodiment of any of the foregoing embodiments, the stop is radially and axially offset from the pin.

In a further embodiment of any of the foregoing embodiments, the stop includes a protruding lip.

In a further embodiment of any of the foregoing embodiments, the protruding lip defines a bearing surface that contacts the ledge. The bearing surface and the ledge having an arced geometry.

A gas turbine engine according to an example of the present disclosure includes a compressor section, a combustor in fluid communication with the compressor section, and a turbine section in fluid communication with the combustor. The turbine section has vane arc segments according to any of the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
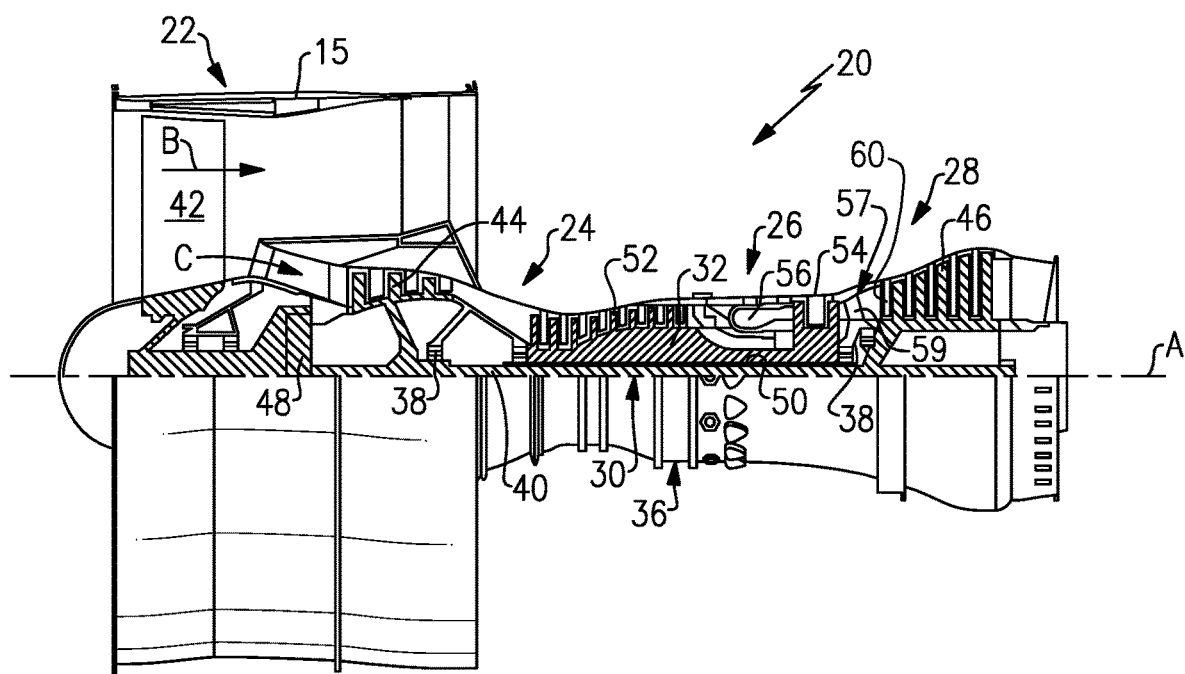
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
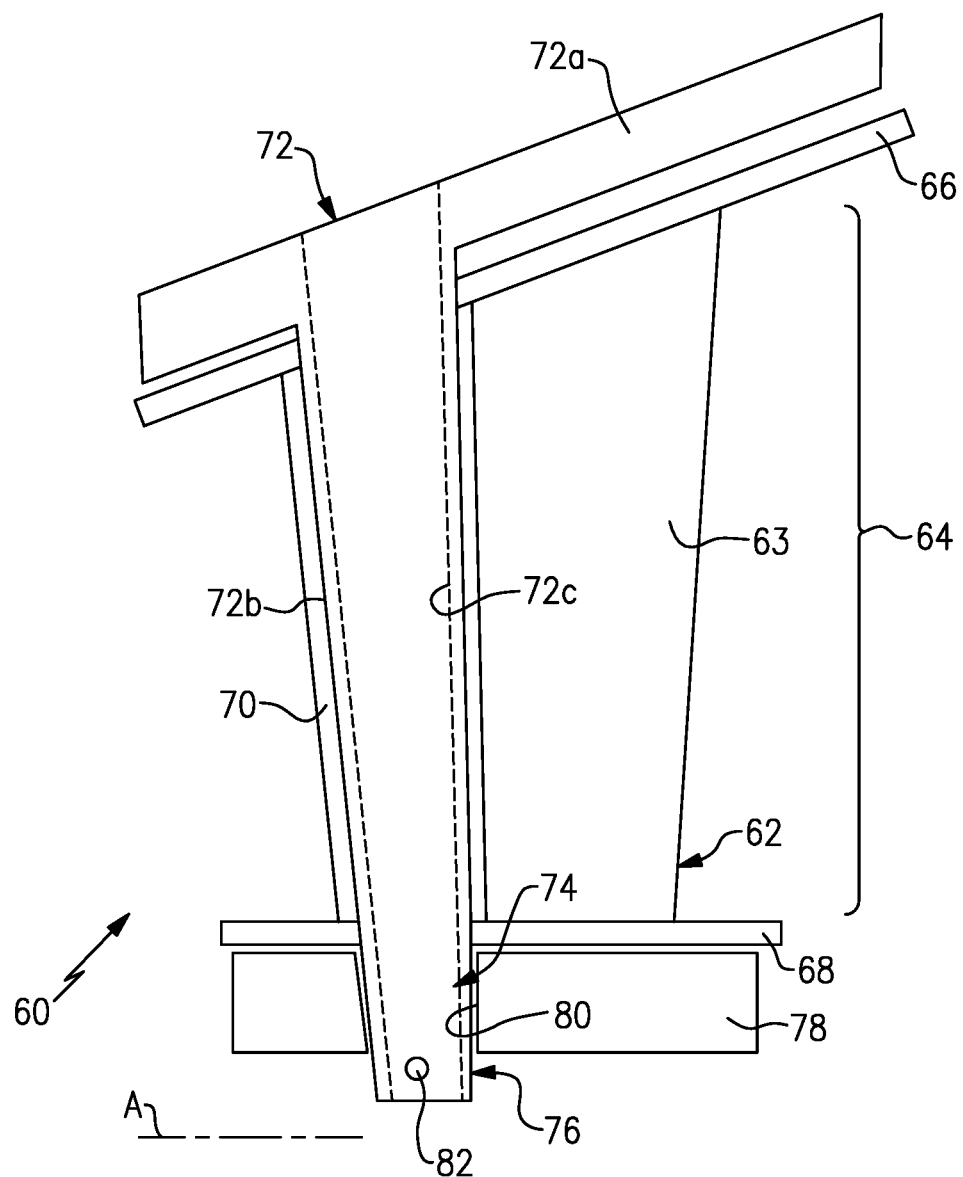
FIG. 2 illustrates a vane arc segment of the turbine engine.

FIG. 2 illustrates a line representation of an example of a vane arc segment 60 from the turbine section 28 of the engine 20 (see also FIG. 1). It is to be understood that although the examples herein are discussed in context of a vane from the turbine section, the examples can be applied to other vanes that have support spars.

The vane arc segment 60 includes an airfoil fairing 62 that is formed by an airfoil wall 63. The airfoil fairing 62 is comprised of an airfoil section 64 and first and second platforms 66/68 between which the airfoil section 64 extends. The airfoil section 64 generally extends in a radial direction relative to the central engine axis A. The terms such as "inner" and "outer" refer to location with respect to the central engine axis A, i.e., radially inner or radially outer.

The airfoil wall 63 is continuous in that the platforms 66/68 and airfoil section 64 constitute a one-piece body. As an example, the airfoil wall 63 is formed of a ceramic material, an organic matrix composite (OMC), or a metal matrix composite (MMC). For instance, the ceramic material is a monolithic ceramic or a ceramic matrix composite (CMC) that is formed of ceramic fibers that are disposed in a ceramic matrix. The monolithic ceramic may be, but is not limited to, SiC or other silicon-containing ceramic. The ceramic matrix composite may be, but is not limited to, a SiC/SiC ceramic matrix composite in which SiC fibers are disposed within a SiC matrix. Example organic matrix composites include, but are not limited to, glass fiber, carbon fiber, and/or aramid fibers disposed in a polymer matrix, such as epoxy. Example metal matrix composites include, but are not limited to, boron carbide fibers and/or alumina fibers disposed in a metal matrix, such as aluminum. The fibers may be provided in fiber plies, which may be woven or unidirectional and may collectively include plies of different fiber weave configurations.

The airfoil section 64 circumscribes an interior through-cavity 70. The airfoil section 64 may have a single through-cavity 70, or the cavity 70 may be divided by one or more ribs. The vane arc segment 60 further includes a spar 72 that extends through the through-cavity 70 and mechanically supports the airfoil fairing 62. The spar 72 includes a spar platform 72a and a spar leg 72b that extends from the spar platform 72a into the through-cavity 70. Although not shown, the spar platform 72a includes attachment features that secure it to a fixed support structure, such as an engine case. The spar leg 72b defines an interior through-passage 72c.

The spar leg 72b has a distal end portion 74 that has a clevis mount 76. The end portion 74 of the spar leg 72b extends past the platform 68 of the airfoil fairing 62 so as to protrude from the fairing 62. There is a support platform 78 adjacent the platform 68 of the airfoil fairing. Although not shown, the support platform 78, the platform 68 of the airfoil fairing 62, or both may have flanges or other mounting features through which the support platform 78 interfaces with the platform 68.

The support platform 78 includes a through-hole 80 through which the end portion 74 of the spar leg 72b extends such that at least a portion of the clevis mount 76 protrudes from the support platform 78. A pin 82 extends though the clevis mount 76. The pin 82 is wider than the through-hole 80. The ends of the pin 82 thus abut the face of the support platform 78 and thereby prevent the spar leg 72b from being retracted in the through-hole 80. The pin 82 thus locks the support platform 78 to the spar leg 72b such that the airfoil fairing 62 is mechanically trapped between the spar platform 72a and the support platform 78. It is to be appreciated that the example configuration could be used at the outer end of the airfoil fairing 62, with the spar 72 being inverted such that the spar platform 72a is adjacent the platform 68 and the support platform 78 is adjacent the platform 66. The spar 72 may be formed of a relatively high temperature resistance, high strength material, such as a single crystal metal alloy (e.g., a single crystal nickel- or cobalt-alloy).

Cooling air, such as bleed air from the compressor section 24, is conveyed into and through the through-passage 72c of the spar 72. This cooling air is destined for a downstream cooling location, such as a tangential onboard injector (TOBI). Cooling air may also be provided into cavity 70 in the gap between the airfoil wall 63 and the spar leg 72b. The through-passage 72c is isolated from the gap. Thus, the cooling air in the through-passage 72c does not intermix with cooling air in the gap.

Figure 3:
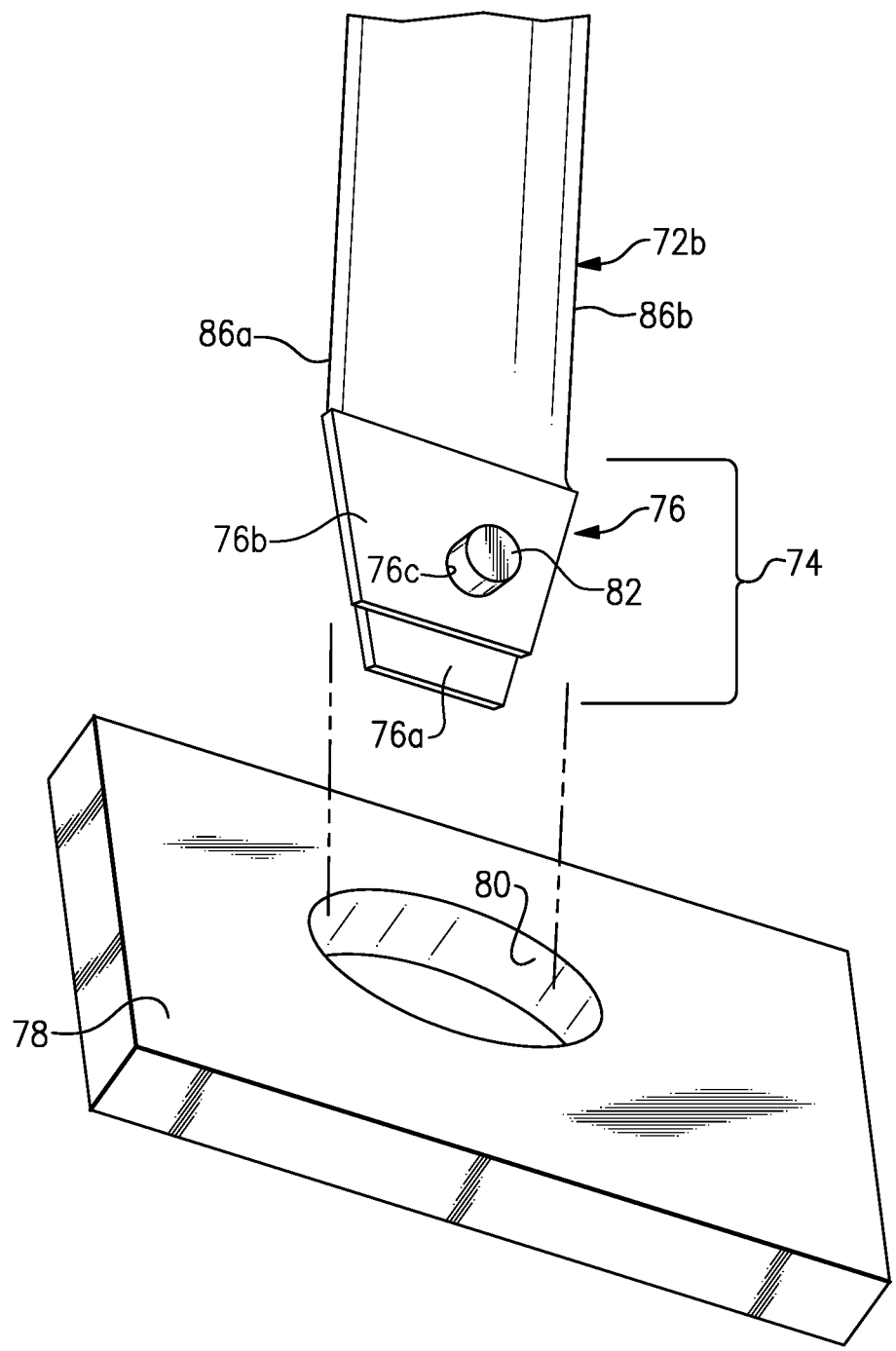
FIG. 3 illustrates an expanded view of a spar and support platform of a vane arc segment.

FIG. 3 illustrates an expanded view of the end portion 74 of the spar leg 72b and the support platform 78. In this example, the clevis mount 76 includes first and second prongs 76a/76b that have respective pin holes 76c that are coaxially aligned with each other. The pin 82 is disposed in the pin holes 76c (after the clevis mount 76 is received through the through-hole 80 in the support platform 78. The prongs 76a/76b are spaced apart so as to form a forked configuration. The through-passage 72c of the spar leg 72b extends between the prongs 76a/76b. The clevis mount 76 thus also serves as an outlet of the through-passage 72c.

Figure 4:
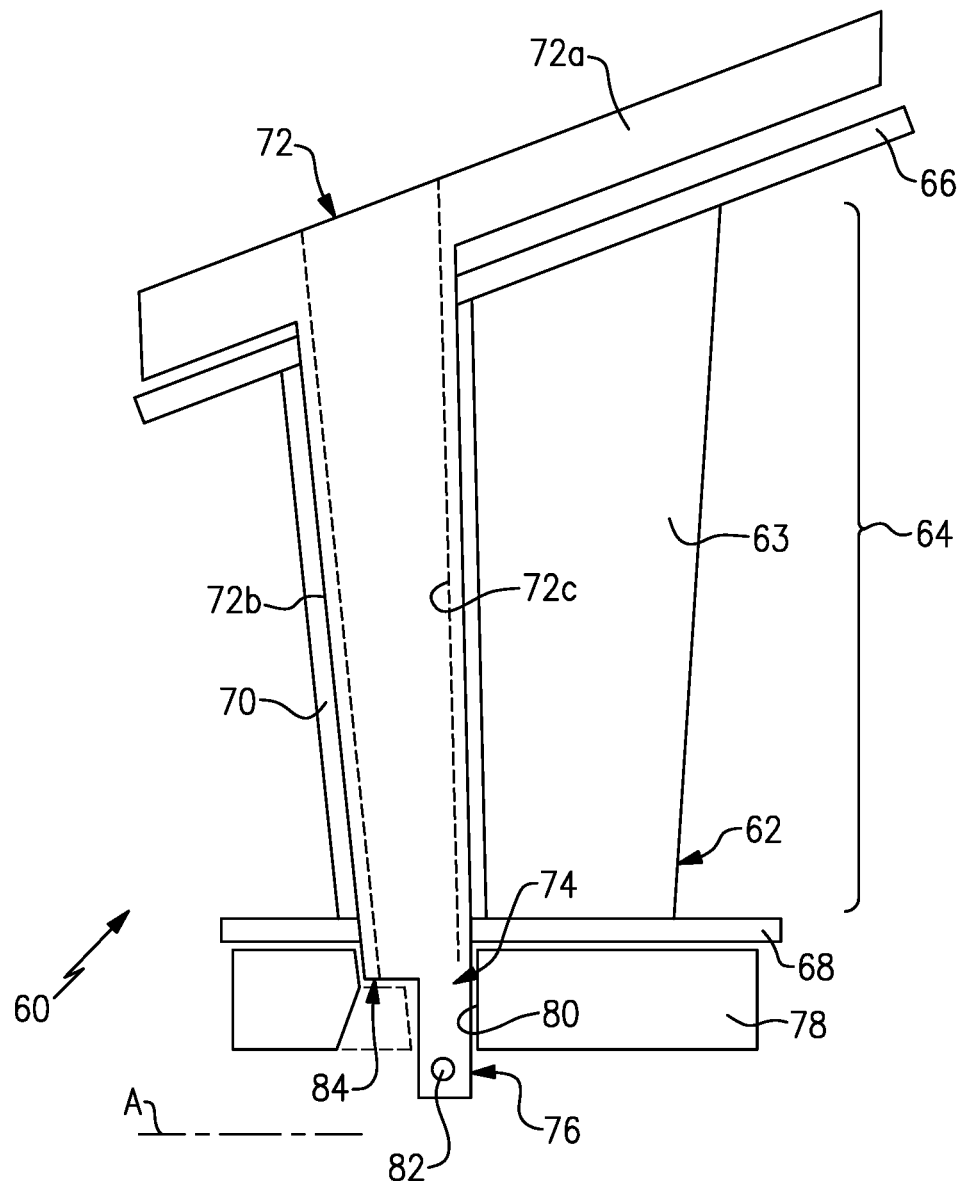
FIG. 4 illustrates another example vane arc segment of the turbine engine.
Figure 5:
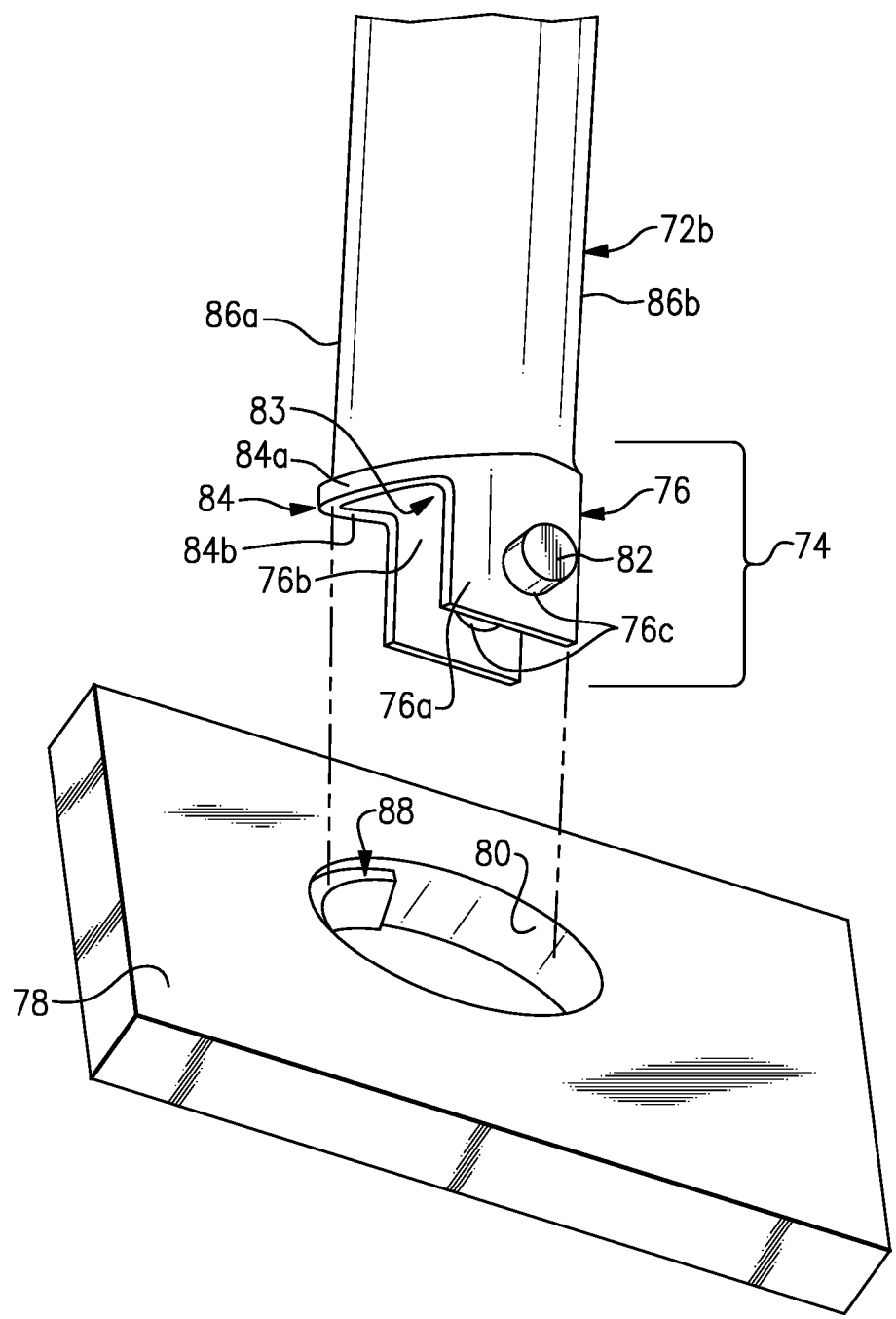
FIG. 5 illustrates an expanded view of the spar and support platform of FIG. 4.

FIGS. 4 and 5 illustrates a further, modified example. In this example, forward of the prongs 76a/76b the end portion 74 of the spar leg 72b includes a stop 84. Relative to forward and aft sides 86a/86b of the spar leg 72b the stop 84 in this example is offset toward the forward side 86a, while the pin holes 76c and pin 82 are offset toward the aft side 86b. The stop 84 is also radially offset from the pin 82. A draft region 83 between the stop 84 and the prongs 76a/76b is open and thus also serves as a portion of the outlet of the through-passage 72c. The draft region 83 increases the overall area of the outlet of the through-passage 72c, in comparison to a straight outlet.

The stop 84 in this example is a protruding lip 84a that projects from the sides of the spar leg 72b. The lip 84a defines a bearing surface 84b. The bearing surface 84b generally tracks the shape of the sides of the spar leg 72b, which in this example is an arc geometry. The stop 84 can have an alternate geometry, such as a tab or tabs, as long as the stop 84 is robust to handle loads transmitted there through. Moreover, as the lip 84a projects from the sides of the spar leg 72b, as opposed to projecting into the through-passage 72c, the stop 84 does not interfere with flow through the through-passage 72c.

The side of the through-hole 80 of the support platform 78 in this example defines a ledge 88. The ledge 88 is a band that protrudes from the side of the through-hole 80 inboard of the face of the support platform 78. The ledge 88 in this example also has an arced geometry, but in general the ledge 88 and stop 84 will be of complementary geometry that enables the stop 84 and ledge 88 to seat together with surface-to-surface contact. Thus, when the end portion 74 of the spar leg 72b is inserted through the through-hole 80 of the support platform 78, the bearing surface 84b seats against the ledge 88. The pin 82 is then inserted through the pin holes 76c to lock the support platform 78 onto the spar leg 72b.

Figure 6:
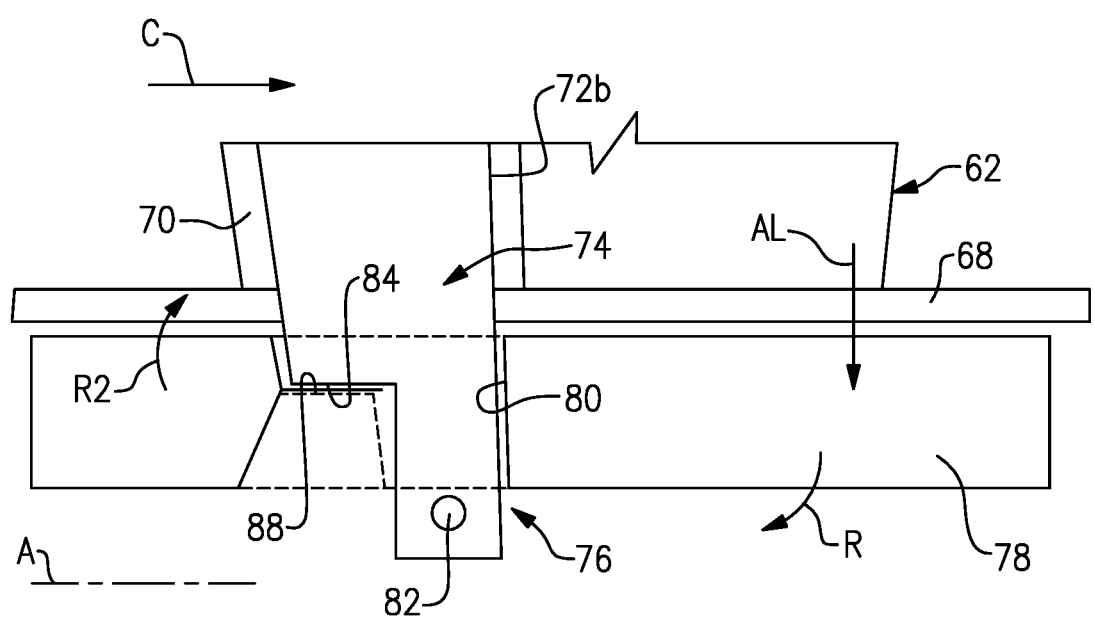
FIG. 6 illustrates a view of a clevis mount and pin of the vane arc segment.

FIG. 6 illustrates a local view of the end portion 74 of the spar leg 72b and the support platform 78. When the engine 20 is running, flow in the core gas path C subjects the airfoil fairing 62 to aerodynamic loads. The aerodynamic loads are reacted out of the airfoil fairing 62 to the spar 72. In this example, the aerodynamic load tends to urge the airfoil fairing 62 in an aft and radially inward direction.

At least a portion of the radial component of the aerodynamic load, represented at AL, is reacted radially inwardly from the airfoil fairing 62 to the support platform 78. However, the pin 82 abuts the underside of the support platform 78 and thereby radially constrains the support platform 78. As a result, since this radial component of the aerodynamic load AL is located toward the aft end of the support platform 78, the support platform 78 has the tendency to teeter on the pin 82 and thus rotate, as indicated at R1 (clockwise in the illustrated example). If permitted to rotate, the forward end of the platform support 78 would tend to rotate radially outwards, as indicated at R2, and exert the load on the forward end of the platform 68 of the airfoil fairing 62. However, the ledge 88 and stop 84 serve as an anti-rotation feature and prevent this. The ledge 88 bears against the bearing surface 84b of the stop 84 upon rotation of the platform support 78. As the spar 72 is fixed, the stop 84 limits the platform support 78 from further rotation and thereby prevents the forward end of the support platform 87 from rotating into the forward end of the platform 68. The load is thus reacted through the stop 84 to the spar leg 72b instead of to the platform 68. In this regard, within the available design space, the axial distance between the stop 84 and the pin 82 may be maximized in order to increase the mechanical advantage and reduce loads. That is, the pin 82 is offset to be near the aft side 86b of the spar leg 72b.

It is to be appreciated that the example configuration may be adapted for other aerodynamic load conditions. For instance, if the aerodynamic load on the airfoil fairing 62 were instead reacted into the forward end of the platform support 78, the stop 84 would instead be offset to the aft side of the spar leg 72b and the clevis mount 76 would be offset toward the forward side of the spar leg 72b. That is, since the support platform 78 teeters about the pin 82, the stop 84 is located on the opposite side of the pin 82 from the location in which the load is transmitted into the spar support 78. Moreover, if the aerodynamic load on the airfoil fairing 62 were instead transmitted radially outwards, the example configuration could be used at the outer end of the airfoil fairing 62, with the spar 72 being inverted such that the spar platform 72a is adjacent the platform 68 and the support platform 78 is adjacent the platform 66.

The stop 84 and ledge 88 permit the loads to be borne by the spar 72 instead of the platform of the airfoil fairing 62. As a result, there may also be additional design flexibility in the positioning of the spar leg 72b, since the spar leg 72b need not be centrally located in order to balance the loads reacted out at the support platform 78.

Figure 7:
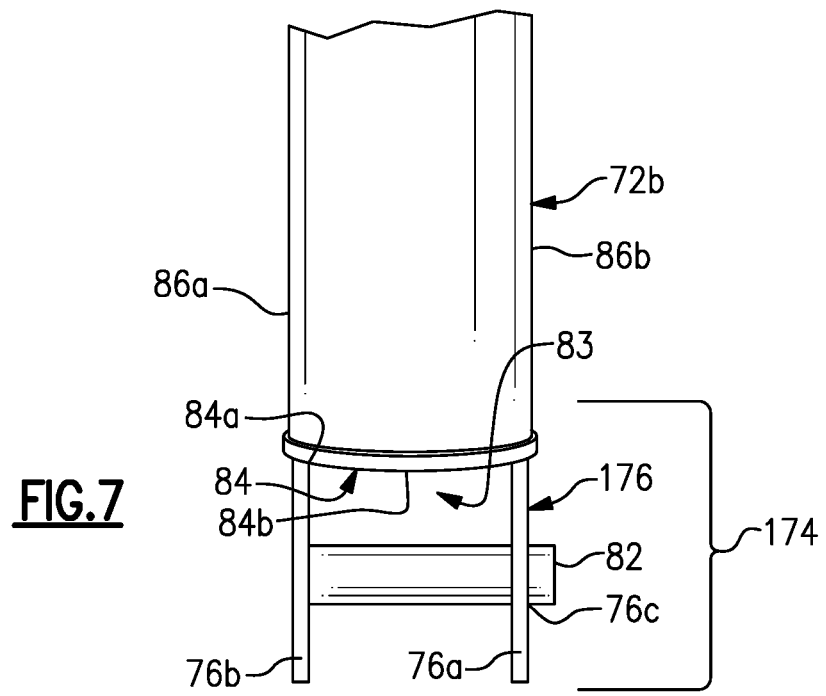
FIG. 7 illustrates another example of a clevis mount in which a single prong receives the pin.

FIG. 7 illustrates another example end portion 174 of the spar leg 72b that can be used in any of the aforementioned examples. In this example, the clevis mount 176 includes the first and second prongs 76a/76b, but only the first prong 76a has a pin hole 76c for the pin 82. The pin 82 is thus cantilevered with respect to the prong 76a. The pin 82 may extend across the space between the prongs 76a/76b and contact the second prong 76b or, alternatively stop short of the second prong 76b.

Figure 8:
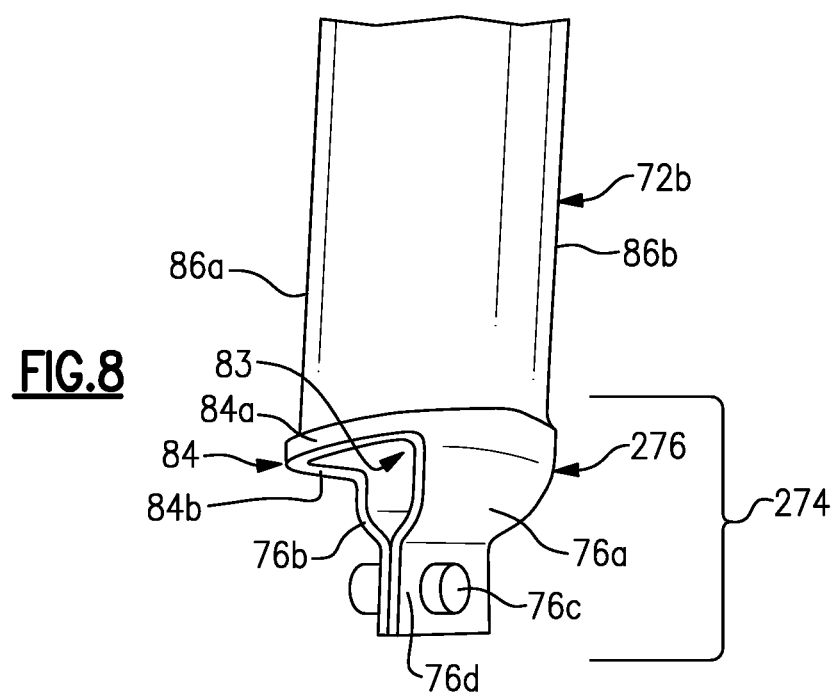
FIG. 8 illustrates another example of a clevis mount in which two prongs converge into a single prong that receives a pin.

FIG. 8 illustrates another example end portion 274 of the spar leg 72b that can be used in any of the aforementioned examples. In this example, the clevis mount 276 includes the first and second prongs 76a/76b, but the prongs 76a/76b converge into a single or compound prong 76d. The pin hole 76c extends through the single prong 76d and the pin 82 is received there through. Even though the prongs 76a/76b converge, the draft region 83 provides open area for outflow from the through-passage 72c in the spar leg 72b. It is to be appreciated from the examples that a "clevis mount" as used herein refers to a fastening system in which there is at least a single prong (e.g., FIG. 8), or more than one prong (e.g., FIGS. 5 and 7), that receives a pin there through in order to fasten the support platform 78 and the spar leg 72b together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
    an airfoil fairing having first and second fairing platforms and a hollow airfoil section extending there between;
    a spar having a spar platform adjacent the first fairing platform and a spar leg that extends from the spar platform and through the hollow airfoil section, the spar leg having an end portion that is distal from the spar platform and that protrudes from the second fairing platform, the end portion having a clevis mount, the clevis mount including first and second prongs that have respective pin holes that are coaxially aligned with each other;
    a support platform adjacent the second fairing platform, the support platform having a through-hole through which the end portion of the spar leg extends such that the clevis mount protrudes from the support platform; and
    a pin disposed in the pin holes and locking the support platform to the spar leg such that the airfoil fairing is trapped between the spar platform and the support platform.

2. The vane arc segment as recited in claim 1, wherein the airfoil fairing is ceramic.

3. The vane arc segment as recited in claim 1, wherein the spar leg includes forward and aft sides, and the pin is offset toward either the forward side or the aft side.

4. The vane arc segment as recited in claim 1, wherein a side of the through-hole defines a ledge and the spar leg has a stop that is complementary to the ledge so as to seat there with.

5. The vane arc segment as recited in claim 4, wherein the stop is radially and axially offset from the pin.

6. The vane arc segment as recited in claim 5, wherein the stop includes a protruding lip.

7. The vane arc segment as recited in claim 6, wherein the protruding lip defines a bearing surface that contacts the ledge, the bearing surface and the ledge having an arced geometry.

8. The vane arc segment as recited in claim 4, wherein the support platform is rotatable about the pin, the stop limits rotational movement of the support platform.

9. The vane arc segment as recited in claim 1, wherein the airfoil fairing is formed by an airfoil wall that is continuous such that the first and second fairing platforms and the hollow airfoil section constitute a one-piece body.

10. The vane arc segment as recited in claim 1, wherein the support platform defines a radially outer side and a radially inner-most side, the through-hole spanning the radially outer side and the radially inner-most side, and the clevis mount protrudes from the radially outer side past the radially inner-most side.

11. A vane arc segment comprising:
    an airfoil fairing having first and second fairing platforms and a hollow airfoil section extending there between, the airfoil being subject to an aerodynamic load;
    a spar having a spar platform adjacent the first fairing platform and a spar leg that extends from the spar platform and through the hollow airfoil section, the spar leg having an end portion that is distal from the spar platform and that protrudes from the second fairing platform, the end portion having a clevis mount;
    a support platform adjacent the second fairing platform, the airfoil fairing transferring at least a portion of the aerodynamic load to the support platform, the support platform having a through-hole through which the end portion of the spar leg extends such that the clevis mount protrudes from the support platform;
    a pin extending though the clevis mount and locking the support platform to the spar leg such that the airfoil fairing is trapped between the spar platform and the support platform;
    a side of the through-hole defining a ledge and the spar leg including a stop that is complementary to the ledge, the support platform rotatable about the pin under the aerodynamic load received from the airfoil fairing, the stop bearing against the ledge and limiting rotation of the support platform.

12. The vane arc segment as recited in claim 11, wherein the clevis mount includes first and second prongs that have respective pin holes that are coaxially aligned with each other, and the pin is disposed in the pin holes.

13. The vane arc segment as recited in claim 12, wherein the airfoil fairing is ceramic.

14. The vane arc segment as recited in claim 12, wherein the stop is radially and axially offset from the pin.

15. The vane arc segment as recited in claim 14, wherein the stop includes a protruding lip.

16. The vane arc segment as recited in claim 15, wherein the protruding lip defines a bearing surface that contacts the ledge, the bearing surface and the ledge having an arced geometry.

17. The vane arc segment as recited in claim 11, wherein an axially leading end of the support platform is radially outwardly rotatable and an axially trailing end of the support platform is radially inwardly rotatable.

18. A gas turbine engine comprising:
a compressor section;
a combustor in fluid communication with the compressor section; and
a turbine section in fluid communication with the combustor, the turbine section having vanes disposed about a central axis of the gas turbine engine, each of the vanes includes:
an airfoil fairing having first and second fairing platforms and a hollow airfoil section extending there between,
a spar having a spar platform adjacent the first fairing platform and a spar leg that extends from the spar platform and through the hollow airfoil section, the spar leg having an end portion that is distal from the spar platform and that protrudes from the second fairing platform, the end portion having a clevis mount,
a support platform adjacent the second fairing platform, the support platform having a through-hole through which the end portion of the spar leg extends such that the clevis mount protrudes from the support platform, a side of the through-hole defining a ledge and the spar leg has a stop that is complementary to the ledge so as to seat there with, and
a pin extending though the clevis mount and locking the support platform to the spar leg such that the airfoil fairing is trapped between the spar platform and the support platform.

19. The gas turbine engine as recited in claim 18, wherein the airfoil fairing is ceramic, the clevis mount includes first and second prongs that have respective pin holes that are coaxially aligned with each other, and the pin is disposed in the pin holes.

20. The gas turbine engine as recited in claim 18, wherein the stop is radially and axially offset from the pin.

21. The gas turbine engine as recited in claim 20, wherein the stop includes a protruding lip, the protruding lip defines a bearing surface that contacts the ledge, the bearing surface and the ledge having an arced geometry.

* * * * *